INVENTOR.
PREBEN JESSEN

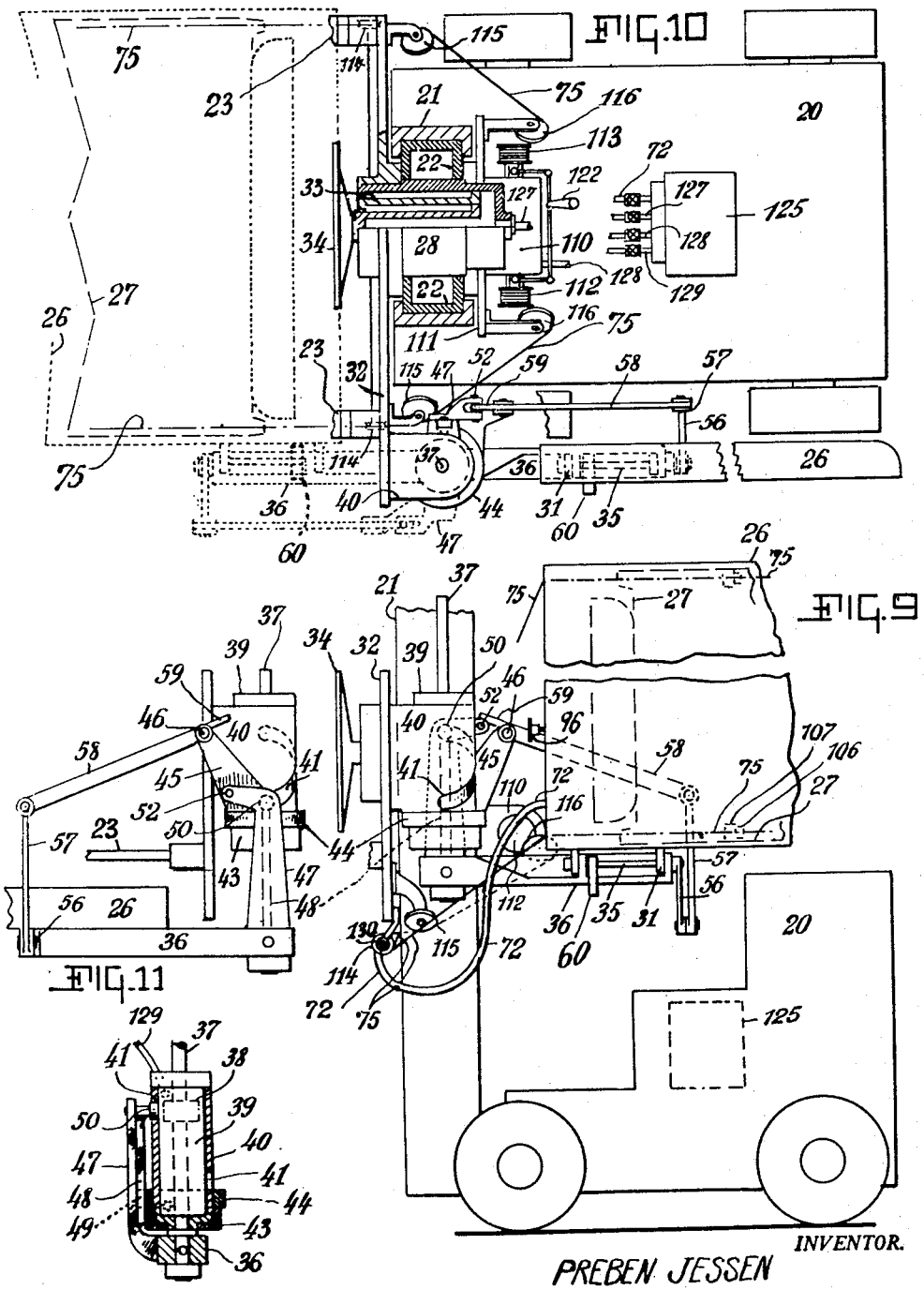

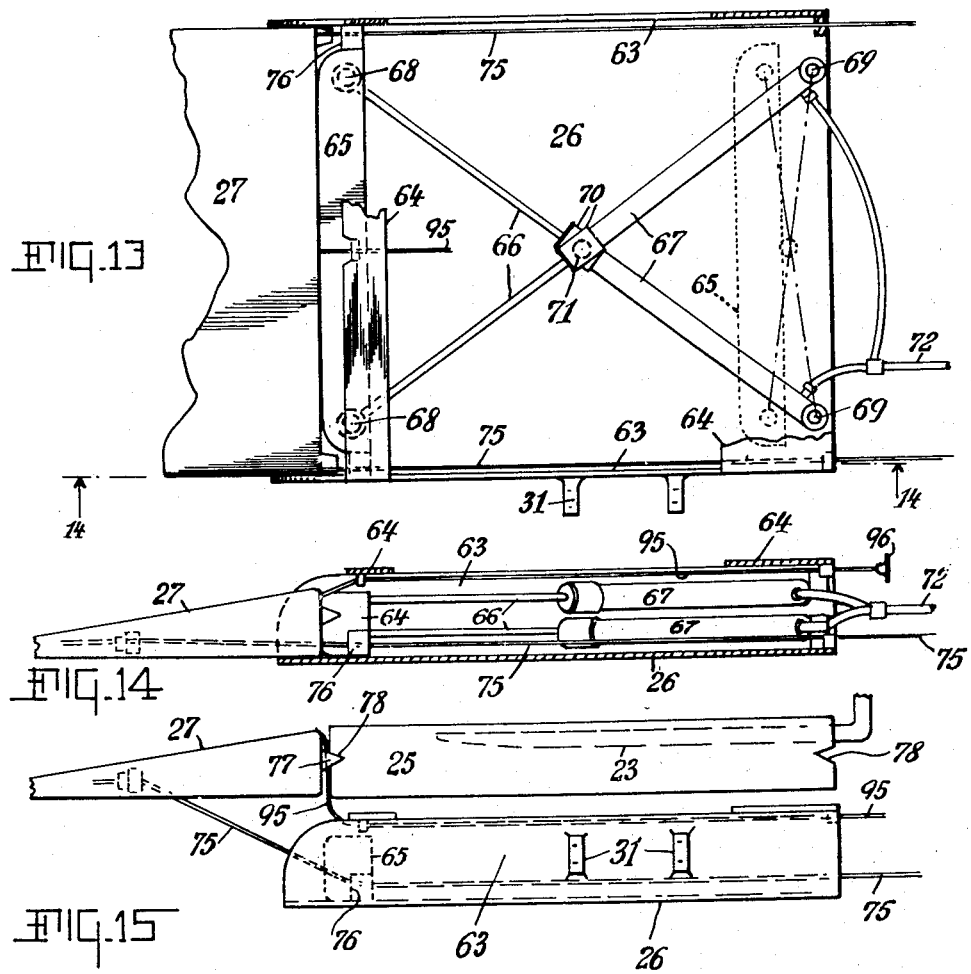

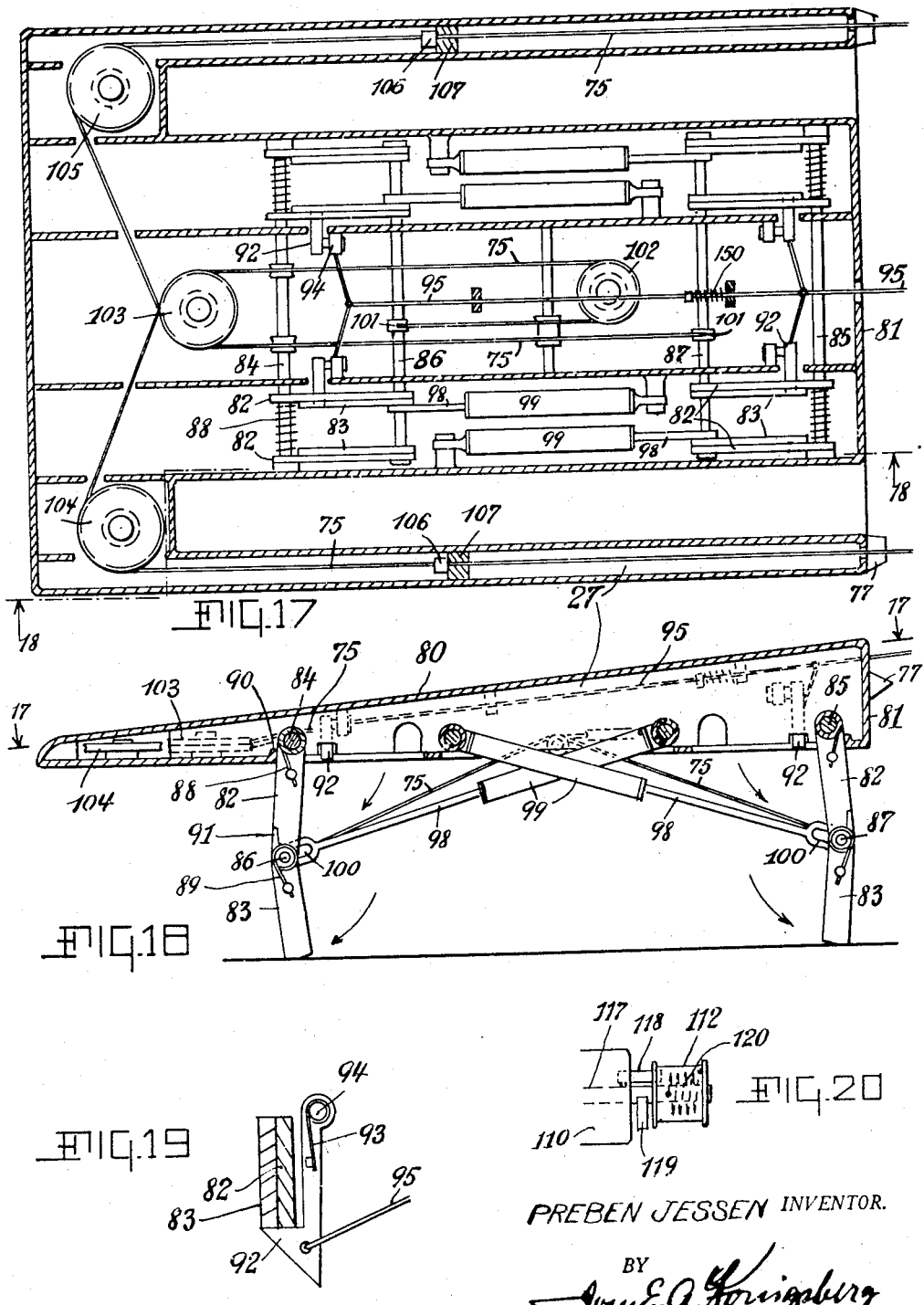

Dec. 3, 1946. P. JESSEN 2,412,155
DEVICE FOR UNLOADING PACKAGED MERCHANDISE
Filed Sept. 27, 1944 5 Sheets-Sheet 5

INVENTOR.
PREBEN JESSEN
BY
Ivan E. C. Konigsberg

Patented Dec. 3, 1946

2,412,155

UNITED STATES PATENT OFFICE 2,412,155

DEVICE FOR UNLOADING PACKAGED MERCHANDISE

Preben Jessen, North Bergen, N. J.

Application September 27, 1944, Serial No. 556,071

2 Claims. (Cl. 214—82)

This invention relates to improvements in industrial trucks for use in handling, loading, unloading and stacking packaged goods and materials. The object of the invention is to provide an industrial fork truck with a novel and improved mechanism for discharging the load whereby to effect important savings in time, labor and operating costs in handling packaged material. The said novel discharging mechanism is embodied in a collapsible platform which is carried by the truck together with automatic operating means for positioning said platform to receive the load from the truck and deposit the load upon the floor or upon a previously deposited load as the case may be. The collapsible platform may also be used as an independent unloading device apart from the truck. In either case, an entirely novel method in discharging and depositing packaged material is involved as a feature of the invention.

The industrial truck is disclosed herein in connection with the handling of packaged material supported upon pallets, skids or the like. The use of the collapsible platform apart from the truck is also disclosed. The detailed construction, mode of operation and the several features of the invention are set forth in the following specification and illustrated in the accompanying drawings in which Figs. 1 to 5 illustrate diagrammatically the operation of the truck in handling packaged material supported upon pallets and discharging the load upon a previously deposited load.

Fig. 9 is a side view of an industrial truck embodying the invention, parts being broken away and parts omitted.

Fig. 10 is a plan view of Fig. 9.

Fig. 11 is a detail view of the platform operating cylinder and associated parts in unloading positions as compared with the positions of these parts as shown in Fig. 9.

Fig. 12 is a detail view of the platform operating cylinder with parts in section.

Fig. 13 is a detail plan view, partly in section, showing the cradle mechanism which contains and supports the platform and the means for expelling the platform from the cradle.

Fig. 14 is a sectional view on the line 14—14 of Fig. 13.

Fig. 15 is a side view of Fig. 13 but shows the platform cradle in lowered position with respect to the platform.

Fig. 16 is a detail view of a cylinder guide connection shown in Fig. 13.

Fig. 17 is a plan sectional view of the platform taken on the line 17—17 of Fig. 18.

Fig. 18 is a sectional view taken on the irregular line 18—18 of Fig. 17. This figure also shows the platform legs in unfolded position extended below the platform.

Fig. 19 is a detail view of a latch device shown in Fig. 17.

Fig. 20 is a diagrammatic view of the winch mechanism for operating the cables whereby the platform is withdrawn into the cradle after unloading.

Figure 1:
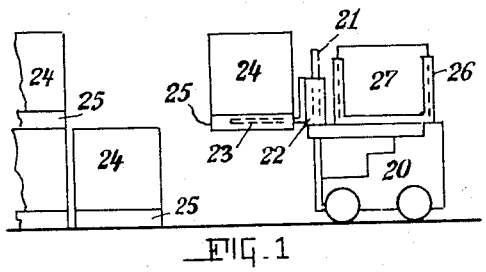

In Figures 1 to 5 the reference numeral 20 denotes an industrial truck which is equipped with a load raising and lowering mechanism comprising fixed guides 21 and a lift 22 which moves up and down between the guides. The lift carries pick up forks 23. A load push off device 28 is also carried by the lift. The packaged material 24 is in known manner supported on pallets 25. The unloading device according to this invention comprises a platform 27 which is carried in a cradle 26. The cradle is supported on the lift to move therewith and is also capable of an independent vertical and swinging movement as will appear hereinafter. Figs. 1 to 5 illustrate the operation of the truck, constructional details being omitted.

Figure 2:
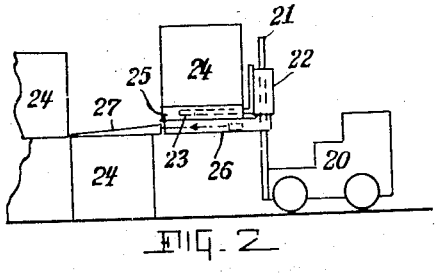
Figure 3:
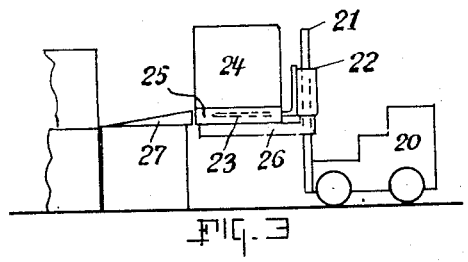
Figure 4:
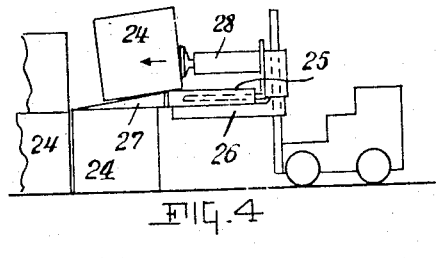
Figure 5:
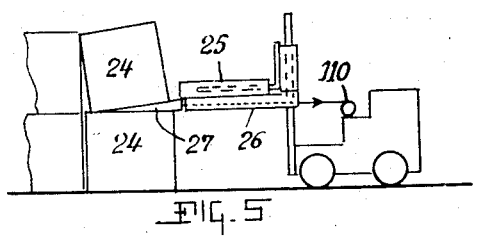

In Fig. 1 the truck has picked up a loaded pallet on the forks 23. The cradle 26 with the platform 27 are carried in their neutral positions upon the truck. In Fig. 2 the truck has arrived in front of a stack of loads 24 which have been previously unloaded from pallets. The cradle 26 has in this figure been moved down below the pallet and the platform has been expelled from the cradle and is now resting upon an unloaded package 24 of material. Inasmuch as the upper surface of the pallet 25 is at a higher level than the platform surface, it is necessary that the pallet and load be lowered in order that the load may be moved smoothly from the pallet to the platform. This situation is shown in Fig. 3. Here the loaded pallet and the cradle have been lowered by operation of the lift 22 and the pallet and the platform are now at the same height. The load is now transferred to the platform by operation of the push off device 28 as shown in Fig. 4. Fig. 5 shows the load finally deposited upon the platform 27. The latter is now pulled out from underneath the load and withdrawn within the platform by a suitable winch mechanism 110. The cradle and platform are thereafter moved back into neutral position upon the truck which may then drive away for another load. In the foregoing operation no manual labor has been employed except that of the truck driver. It will be observed that the pallet 25 in Fig. 5 no longer carries a load. The pallet may therefore be removed for use with another load. If, for example, the packaged material is unloaded into a railroad car for shipment to a distant point, the pallets are not tied up with such shipments but may be used immediately for other purposes.

Figure 6:
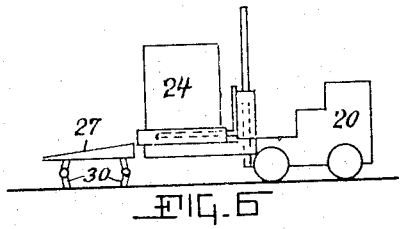
Figs. 6 to 8 illustrate the operation when the load is to be deposited upon the floor.
Figure 7:
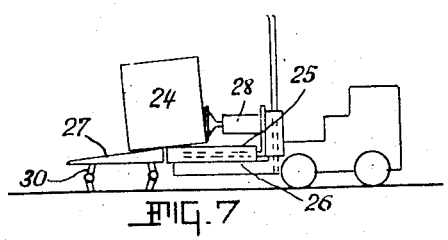
Figure 8:
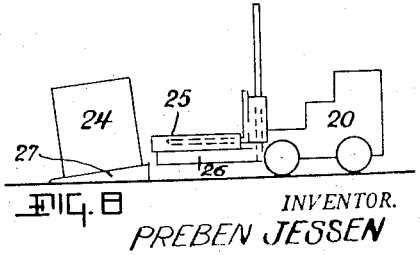

If the material is to be unloaded upon the floor a somewhat different operation is necessary. This is illustrated in Figs. 6 to 8. In Fig. 6 the loaded truck has arrived at the unloading point and the platform has been expelled from the cradle. In order to raise the platform to receive the load collapsible legs 30 carried by the platform are automatically unfolded below the platform for its support upon the floor. Then the pallet and the load are lowered to platform level as in Fig. 3 and the load is transferred to the platform, Fig. 7. The platform now collapses under the weight of the load. When thereafter the platform is pulled out from underneath the load, the latter will remain deposited upon the floor, Fig. 8.

Referring now to Figs. 8 to 12 the cradle 26 which carries the platform is shown as being provided with lugs 31 secured to a rotatable pivot shaft 35 carried in a cradle arm 36. The arm 36 is secured to the piston stem 37 of a piston 38 which is hydraulically operated within a cylinder 39, Fig. 12. The cylinder is mounted upon a main supporting plate 32 which is secured to the lift 22, Figs. 9 and 10. The plate 32 carries the cylinder mechanism 39, the pick up forks 23 and the load push off device 28. The latter may be in the form of a hydraulically operated telescopic piston 33 moving within a cylinder and carrying a pusher head 34. The cylinder 39 is supported within a cam sleeve 40 which has a cam 41 reaching 180 degrees around the cylinder. The cam sleeve is secured to the main plate 32 by any suitable means not shown. A supporting ring 43 is secured upon the cylinder 39 to form a fixed support for a freely rotatable bearing 44 which has an upstanding arm 45 forming a fulcrum at 46. The cradle arm 36 has an upright key arm 47 with a vertical key 48 which slides in a keyway 49 in the rotatable bearing 44. The key arm 47 carries a cam roller 50 which runs in the cam slot 41. The arm 47 also carries a pin 52.

When power is applied to move the piston 38 down, the piston stem descends and the cradle arm 36 will be moved down from the position shown in Fig. 9 to that shown in Fig. 11. As the cradle arm moves down, the key 48 slides down in the keyway 49 and at the same time the cam roller 50 runs down in the fixed cam slot 41. The result of these movements is that the cradle arm is lowered and also moved around 180 degrees to the position shown dotted in Fig. 10.

During this lowering and swinging movement of the cradle arm 36, the cradle itself is moved from the vertical neutral position in Fig. 9 to the horizontal unloading position shown in Fig. 11. See also Fig. 2. This 90 degree movement from vertical to horizontal is accomplished by the following means. The pivot shaft 35 carries a lever 56 which is connected by a link 57 with an inclined lever 58 pivoted on the fulcrum 46 and having a nose 59 which rests upon the above described pin 52. In Fig. 9 the pivot shaft 35 cannot be rotated because the lever 58 cannot swing about the point 46 and the cradle is therefore held in upright neutral position. From the latter the cradle is swung in to horizontal unloading position by the combined actions of the lever 58, the link 57 and the arm 56 whereby the shaft 35 is rotated 90 degrees. As the fulcrum 46 is moved horizontally through an arc of 180 degrees and the pin 52 is lowered away from the nose 59 on the lever 58, 57 and 56 have a combined cooperative movement whereby the shaft 35 is rotated to lower the cradle and the parts come to rest in the dotted position shown in Fig. 10. The cradle is stopped in unloading position by a stop finger 60 on the shaft 35 which moves in under the cradle arm and prevents further rotation of the shaft 35.

The platform is expelled from the cradle by an expelling mechanism shown in Figs. 13 and 14. The cradle is in the form of a trough 26 having a solid bottom and sides 63, 63. Cross braces as at 64, 64 are provided to strengthen the construction. The cradle contains a platform pusher head 65 which is moved back and forth by piston arms 66 which move in hydraulically operated cylinders 67. The arms are pivoted to the pusher head at 68, 68. The cylinders are pivoted to the cradle at 69, 69. The cylinders are connected in mutual sliding relation by a cylinder guide consisting of two rings 70, 70 which are pivoted together at 71, Fig. 16. The cylinders pass freely through the rings. When power is applied to the cylinders through a suitable hose connection 72, the piston arms are forced out of the cylinders to move the pusher head outward to expel the platform. The normal inner position of the pusher head is shown in dotted lines.

The platform, Figs. 17 and 18, is in the form of a wedge shaped hollow box having a flat top 80. The rear end 81 is closed so that it may be engaged by the pusher head 65. The collapsible leg mechanism hereinabove referred to comprises the following elements. The platform carries four legs. Each leg consists of a pair of upper links 82 and a pair of lower links 83. The two front legs are pivoted on a transverse shaft 84 supported on the platform. The two rear legs are pivoted on a transverse shaft 85. The links in the front legs are hinged together by a shaft 86. The links in the rear legs are hinged together by another shaft 87. The hinge shafts 86 and 87 move up and down freely as the legs are unfolded and collapsed. Springs 88 and 89 urge the unfolding of the legs in the direction of the arrows in Fig. 18. The legs are stopped in unfolded positions by stops at 90 and 91. Normally the legs are held in collapsed position within the platform by swinging latches 92, Fig. 19, which are urged in under the legs by springs 93. The latches are pivoted at 94 on the platform and are released by means of a cable 95 having a handle 96, Figs. 14 and 9. Each leg is further connected to the platform by a piston arm 98 which moves in a dash pot cylinder 99 pivoted to the platform. The arms 98 engage the hinge shafts 86 and 87 by means of slots 100.

When the latches 92 are released the legs unfold automatically by the action of the springs 88 and 89. The legs are caused to collapse by means of the platform withdrawing cables 75 which are operated by a winch mechanism to be explained hereafter. There is a cable 75 on each side of the platform. The platform ends of the cables are attached to the hinge shafts 86 and 87 at the points 101, Fig. 17. The one cable runs from the point 101 on shaft 86 over the idler sheaves 102, 103 and 104 and then back out from the platform. The other cable 75 runs from the point 101 on the shaft 87 over the sheaves 103 and 105 and then out from the platform. Each cable carries a fixed stop 106 adapted to engage fixed braces 107 in the platform, respectively.

The free ends of the cables 75 leading out from the platform pass over guiding pulleys and sheaves to a power winch 110, Fig. 10, which is mounted on a supporting plate 111 secured to the rear side of the lift 22. The winch has two cable drums 112 and 113. The cables 75 pass from the platform over guide pulleys 114 and cable sheaves 115 and 116 to the cable drums. These latter are operated as follows, see Fig. 20. The winch 110 rotates the cable drum shaft 117 as usual. The drum 112 is adapted to be clutched to the shaft by a hydraulic clutch 118 and the shaft may be locked by a brake 119. A coiled power spring 120 has one end connected to the shaft and the other end is connected to the drum. In the neutral upright position of the cradle and platform as in Fig. 9 the two cables 75 pass from the cable drums over the sheaves 116 and 115, guiding pulleys 114 and then up to the platform within the cradle. The cables are kept taut because at this time the drum springs 120 tend to wind up the drums with the cables thereon, the clutches being out and the brakes on, it being understood that the construction in Fig. 20 is duplicated for the other cable drum 113. The springs 120 are powered to wind up the cables so long as there are free cable lengths to be wound upon the drums. The clutches are operated by a handle 122, Fig. 10. The brake or brakes 119 may be hand or foot operated, no special mechanism being shown. Inasmuch as hydraulic winches, clutches, brakes, cable drums and the like are ordinary articles of trade it is thought that the foregoing description and the illustration shown are sufficient for understanding the invention.

A hydraulic power supply pump unit of any known type 125 Fig. 10, supplies the power for the hydraulically operated units. The pump has four hose lines of which the line 72 leads to the cylinders 67 in Fig. 13; the line 127 connects with the push off unit 28; the line 128 may connect with the winch 110 and the line 129 supplies the cylinder 39 in Fig. 12. The hose connections are made in the usual manner known to the art for proper operation as will be understood.

The hose 72 extends from the pump forwardly up over and around a shaft 130 which carries the pulleys 114 and thence upwards to the cradle. The hose connections are severally valve controlled as shown. All parts which are to be manually operated by the truck driver are suitably positioned so as to be within convenient reach.

Operation: Assuming that a load of packaged material is to be unloaded and deposited at a level above floor level, the operation is as follows. When the truck arrives at the point of unloading the truck driver operates the lift 22 to bring the loaded pallet to the proper level with respect to the load receiving surface as indicated in Fig. 2. The driver then connects the hydraulic pump with the main operating cylinder 39 which causes the cradle 26 with the platform 27 to be moved down into unloading position in front of the truck underneath the pallet. Fig. 11 shows the unloading position of the cradle below the forks 23 which carry the pallet. The latter is not shown in this figure. During this movement the drum springs 120 will rotate the drums to wind up the two cables 75. The drum 113 will of course operate longer than the drum 112 because of the greater length of cable to be wound on that side. The drums are unclutched from the winch shaft and the brake is on.

Then the pusher cylinders 67 in the cradle are operated and the pusher head 65 engages the platform and pushes it out from the cradle. During this movement the cables 75 unwind from the cable drums which in turn unwind the springs 120. The platform and cradle are now in the positions shown in Figs. 13 and 14.

Thereafter the lift is operated to lower the pallet into alinement with the platform, the cradle being lowered at the same time, Fig. 15. The lowering of the cradle causes a tightening of the cables 75 which serves to pull the platform against the pallet. The platform may have lugs 77 to engage notches 78 in the pallet whereby to lock these elements together to facilitate the transfer of the load from the pallet to the platform. The load is then transferred by operating the push off device 28 and thereafter the lift is again operated to lift the cradle into alinement with the platform.

The pressure in the cylinders 67 having been released the cable drum clutches are thrown in and the winch started to rotate the drums and wind up the cables 75. The stops 106 on the cables engage the braces 107 on the platform to pull the latter back into the cradle. The platform in its return movement engages the pusher head 65 and moves it back into the cradle. The pusher head has cable guides at 76, Fig. 15, to keep the cables from snarling. When the platform is entirely withdrawn power is again applied to the cylinder 39 to operate the cradle and platform back into upright neutral positions. At this time the drum clutches are thrown out and the brakes applied so that as the platform moves back into upright position, the cables 75 unwind against the force of the springs 120 and are kept taut.

When the platform is to be used as a collapsible platform the operation is as follows. Before moving the cradle and platform down into unloading position, the legs are released from the latches so that the legs will be ready to unfold by the action of the springs 88 and 89 as soon as the platform has moved sufficiently out from the cradle to permit such unfolding. The truck driver seizes the grip 96 which is attached to the end of the cable 95. The grip projects from the side of the cradle, Fig. 9. A slight pull on the cable moves the latches away from the legs and the latter immediately are now moved outward past the latches and pressed against the bottom of the cradle. The driver now lets go of the grip 96 and the cable 95 is pulled back by a spring 150, Fig. 17, so that the latches may again be operated to engage the legs.

The cradle and platform are now moved down into unloading position and as soon as the platform has been sufficiently expelled the legs automatically unfold under the action of the springs 88 and 89. The front legs will unfold first and then the rear legs. The unfolding of the legs causes a lengthening of the cables 75 sufficient to space stops 106 on the cables a short distance away from the braces 107. The load is then transferred from the truck to the platform. Thereafter the driver throws in the clutches on the winch which is operated to wind up the cables 75 sufficiently to pull the legs off center position so that they will collapse under the weight of the load. The platform is lowered slowly under the load because the collapsing movement of the legs is gradual due to the dash pot action of the cylinders 99. As the legs swing up into the platform, they engage the latches and move them to one side. When the legs are in full up position they are caught and held by the latches. Thereafter the winch is operated to pull the platform from underneath the load and into the cradle. The operation is then completed by swinging the cradle and platform up into neutral position.

Figure 22:
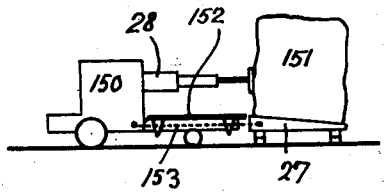
Figs. 21 to 23 illustrate diagrammatically the use of the discharging platform in connection with a low lift truck.
Figure 21:
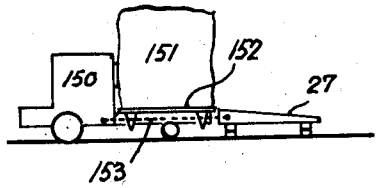
Figure 23:
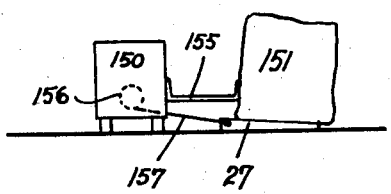
Figure 24:
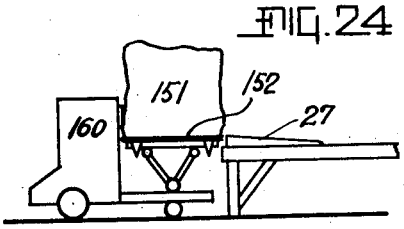
Fig. 24 is a diagram showing the use of the platform with a high lift truck.

The unloading platform 27 may be used as an independent unloading device apart from the truck in the manner illustrated in Figs. 21 to 23. In these figures a low lift industrial truck 150 has picked up a load 151 supported on a skid 152 and has arrived at the unloading point, Fig. 21. The platform 27 is then placed upon the floor and connected to the truck by a chain 153. The load is then pushed off the skid and onto the platform, Fig. 22. Thereafter the platform is withdrawn from under the load. This is accomplished by placing a bracing element 155 between the load and the truck and then connecting the platform to a winch 156 by a cable 157. As the cable is wound up the platform is pulled out from under the load. Fig. 23 shows the truck turned parallel to the load because in practice it will often be found necessary to do so because of limited space in handling and loading packaged merchandise. The use of the platform in connection with a high lift truck 160 is shown in Fig. 24.

Figure 25:
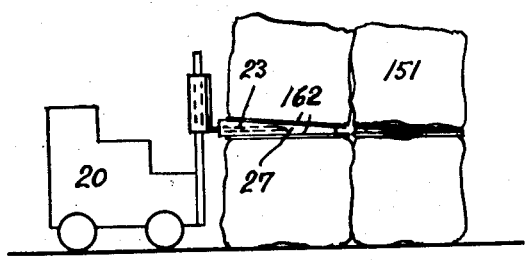
Fig. 25 is a diagram showing how the platform may be used as a pallet and load pick up device.
Figure 26:
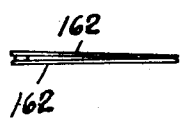
Fig. 26 illustrates a device shown in Fig. 25 for separating stacked packaged merchandise.

In the foregoing disclosure the platform 27 has been described and shown as an unloading device. It may, however, also be used as a load pick up device or be used to replace pallets. Thus, for example, packaged merchandise may be divided into suitable load units by means of separating boards 162 as shown in Fig. 25. Such boards will provide a space or pocket between load units for the entrance of the thin edge of the platform 27. The platform will be carried directly upon the forks 23 of the truck 20. As the truck drives forward the platform will be squeezed in between the load units as will be understood. After the platform has been moved in between the loads, the platform with the load will be raised off the stack and moved to another point. Here the platform may be lowered to unloading level and then withdrawn from under the load. If, for example, packaged merchandise is stacked in a railroad car for shipping, the loads units may be separated as shown for easy unloading at the point of destination by means of fork trucks. Thus the expensive pallets are not used for transport.

I claim:

1. In an industrial fork truck, a mechanism for unloading merchandise supported on a pallet carried by the fork on the truck comprising a movable cradle, an unloading platform slidably supported within the cradle, means for supporting the cradle on the truck in a normal inoperative position, means for moving the cradle into an unloading position underneath the said pallet, means within the cradle for moving the platform out of the cradle to a load receiving position in front of and level with the pallet, means on the truck for transferring the load from the pallet to the platform, means on the truck for withdrawing the platform from underneath the load and means on the truck for moving the cradle back into its said inoperaive position on the truck.

2. In an industrial truck, an unloading mechanism comprising a vertically and horizontally movable cradle, hydraulic means on the truck for moving said cradle from a vertical inoperative position to a horizontal unloading position, an unloading platform slidably supported within said cradle, hydraulic means within said cradle operatively connected to said platform for expelling the latter from the cradle after the cradle has been moved into its said unloading position, means for transferring a load from the truck to the said expelled platform, means on the truck for moving the platform away from underneath the load and back into the cradle and means for actuating the said cradle moving means to move the cradle back into its said vertical position.

PREBEN JESSEN.